(12) United States Patent
Ainslie

(10) Patent No.: US 10,953,997 B2
(45) Date of Patent: Mar. 23, 2021

(54) TRANSLATABLE SCOOP FOR AUXILIARY POWER UNITS AIR INTAKE

(71) Applicant: SAFRAN POWER UNIT, Toulouse (FR)

(72) Inventor: Walter Ainslie, Ramona, CA (US)

(73) Assignee: SAFRAN POWER UNITS, Toulouse (FR)

(*) Notice: Subject to any disclaimer, the term of this patent is extended or adjusted under 35 U.S.C. 154(b) by 674 days.

(21) Appl. No.: 15/709,649

(22) Filed: Sep. 20, 2017

(65) Prior Publication Data

US 2018/0093779 A1    Apr. 5, 2018

Related U.S. Application Data

(60) Provisional application No. 62/404,330, filed on Oct. 5, 2016.

(51) Int. Cl.
*B64D 33/02*    (2006.01)
*B64D 41/00*    (2006.01)

(52) U.S. Cl.
CPC ............. *B64D 33/02* (2013.01); *B64D 41/00* (2013.01); *B64D 2033/0213* (2013.01)

(58) Field of Classification Search
CPC .................. B64D 2033/0213; B64D 33/02; B64D 41/00; B64D 2041/002
See application file for complete search history.

(56) References Cited

U.S. PATENT DOCUMENTS

| | | |
|---|---|---|
| 2,694,357 A | 11/1954 | Lee |
| 4,121,606 A | 10/1978 | Holland et al. |
| 4,174,083 A | 11/1979 | Mohn |
| 6,349,899 B1 * | 2/2002 | Ralston .................. B64D 33/02 244/53 B |
| 7,014,144 B2 * | 3/2006 | Hein ...................... B64D 33/02 244/53 B |
| 7,210,652 B2 * | 5/2007 | Hein ...................... B64D 33/02 244/53 B |
| 7,461,814 B2 * | 12/2008 | Hein ...................... B64D 33/02 244/53 B |
| 7,469,545 B2 | 12/2008 | Riley |

(Continued)

FOREIGN PATENT DOCUMENTS

| | | |
|---|---|---|
| EP | 3168157 A1 | 5/2017 |
| GB | 1212875 A | 11/1970 |
| WO | 2005/016748 A2 | 2/2005 |

OTHER PUBLICATIONS

International Search Report/Written Opinion dated Nov. 28, 2017, 13 pages.

*Primary Examiner* — Philip J Bonzell
(74) *Attorney, Agent, or Firm* — Rankin, Hill & Clark LLP

(57) ABSTRACT

An air intake assembly for an aircraft includes an auxiliary power unit intake that is defined by a skin of the aircraft. The auxiliary power unit intake is in fluid communication with an auxiliary power unit. The air intake assembly also includes a translatable scoop that defines a stowed condition and a fully deployed condition. The translatable scoop directs air exterior to the aircraft into the auxiliary power unit intake when in the fully deployed condition and does not direct the air exterior to the aircraft into the auxiliary power unit intake when in the stowed condition.

15 Claims, 9 Drawing Sheets

(56) References Cited

U.S. PATENT DOCUMENTS

| | | | | |
|---|---|---|---|---|
| 7,665,694 | B2* | 2/2010 | Hein | B64D 41/00 244/129.5 |
| 9,145,214 | B2 | 9/2015 | Payangapadan et al. | |
| 10,252,811 | B2* | 4/2019 | Bell | F02C 7/05 |
| 2005/0224635 | A1* | 10/2005 | Hein | B64D 41/00 244/10 |
| 2006/0102776 | A1* | 5/2006 | Hein | F02C 7/32 244/10 |
| 2006/0102781 | A1* | 5/2006 | Hein | F02C 7/32 244/58 |
| 2009/0065297 | A1* | 3/2009 | Hein | B64D 33/02 181/259 |
| 2013/0081706 | A1 | 4/2013 | Garcia Nevado et al. | |
| 2016/0264251 | A1* | 9/2016 | Bell | B64D 15/16 |
| 2020/0079519 | A1* | 3/2020 | Canalejo Bautista | F02C 7/052 |

* cited by examiner

TRANSLATABLE SCOOP FOR AUXILIARY POWER UNITS AIR INTAKE

BACKGROUND

Auxiliary power units (APUs) are used in vehicles to provide energy for functions other than propulsion. Notably, APUs are frequently utilized in aircraft to start the main engines of the aircraft. Additionally, APUs can be used to provide electrical power to the various electrical components within the aircraft while the aircraft is on the ground or in the air (i.e., in-flight). APUs are especially useful when the aircraft is in-flight and an emergency occurs that prevents the various electrical components from receiving electrical power from traditional means. When this occurs, the APU can be used to supply emergency electrical power to the various components within the aircraft.

For the APU to operate at maximum capacity, a large amount of air must be supplied to the APU. To provide this large amount of air, a variety of techniques can be utilized. For example, a fixed external scoop can be used to direct air into an intake of the APU. However, the fixed external scoop results in an increased aerodynamic drag that negatively impacts the aircraft. Further, as the external scoop is fixed in a deployed state, the negative impacts for the aircraft are encountered even when the APU is not being used.

The drag issue can be somewhat addressed with either a NACA (National Advisory Committee for Aeronautics) scoop or by adding an inlet door near the APU inlet. However, a NACA scoop is long relative to its width and requires significant space within the aircraft skin. As will be appreciated, these requirements can complicate matters when a new aircraft is being designed.

Further, the addition of the inlet door is also not optimal. Notably, the APU cannot operate at full capacity until the inlet door is in the proper position. Additionally, the inlet door requires powered actuators to open the door against the exterior airflow. These powered actuators can be susceptible to damage and increase an overall weight of the aircraft.

Thus, the known techniques for supplying air to an APU are overly complicated, thereby increasing costs and weight of the aircraft. Further, the known techniques may not be aesthetically pleasing or elegant. Thus, there is room for improvement.

SUMMARY

In view of the foregoing, a novel air intake assembly for an aircraft includes an auxiliary power unit intake that is defined by a skin of the aircraft. The auxiliary power unit intake is in fluid communication with an auxiliary power unit. The air intake assembly also includes a translatable scoop that defines a stowed condition and a fully deployed condition. The translatable scoop directs air exterior to the aircraft into the auxiliary power unit intake when in the fully deployed condition and does not direct the air exterior to the aircraft into the auxiliary power unit intake when in the stowed condition.

DETAILED DESCRIPTION

Figure 1:
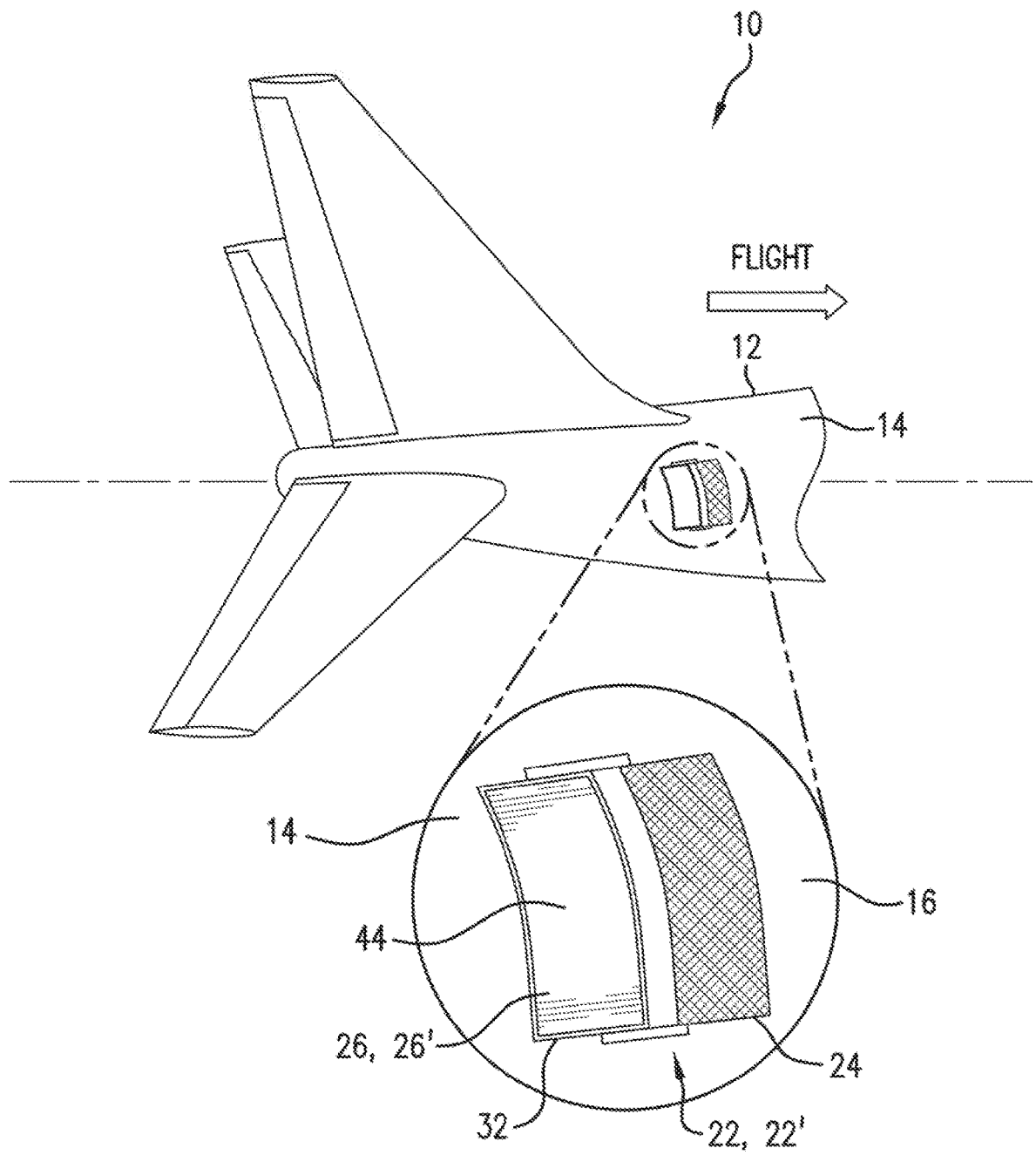
FIG. 1 is a perspective view of an air intake assembly for an aircraft with a translatable scoop in a stowed condition.

With reference to FIGS. 1, 2, 4, 6, and 7, a partial perspective view of an aircraft 10 is shown. The aircraft 10 includes a fuselage 12 that is defined by an aircraft skin 14. The fuselage 12 is the main body section of the aircraft 10 that can contain crew, passengers, and/or cargo. A centerline is illustrated which defines a longitudinal axis. For reference, a flight direction is also shown with an arrow and defines a forward direction. As such, a direction opposite to the flight arrow would be the longitudinally rearward or simply rearward, direction. As illustrated in FIGS. 3, 5, and 8, the skin 14 includes an outer surface 16 and an inner surface 18.

An air intake assembly 22, 22', 22" is shown in FIGS. 1-8. For reference, like elements will use like reference numbers throughout the disclosure. Where there are pertinent differences, the elements will be identified with an apostrophe appended to the reference number. The air intake assembly 22, 22', 22" can include an auxiliary power unit (APU) intake 24 and a translatable scoop 26, 26', 26". The APU intake 24 is defined by the aircraft skin 14. Further, an auxiliary power unit (APU) intake channel 24a can fluidly connect the APU intake 24 to an auxiliary power unit (APU) 28. The APU intake channel 24a may be shortened, changed in shape, or entirely removed from the aircraft 10 without departing from the scope of the disclosure.

Figure 2:
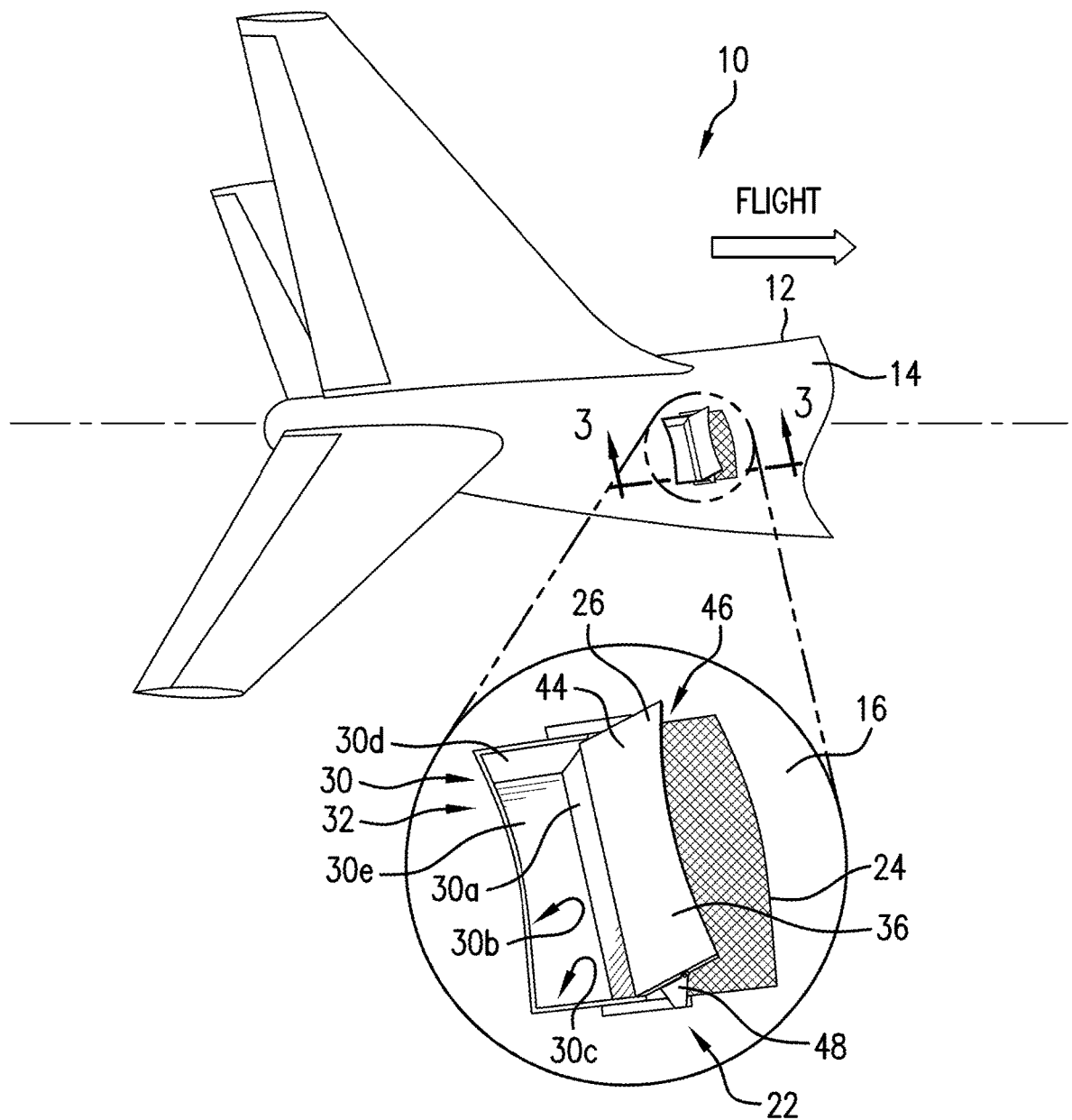
FIG. 2 is a perspective view of an air intake assembly for an aircraft with a translatable scoop in a fully deployed condition.
Figure 3:
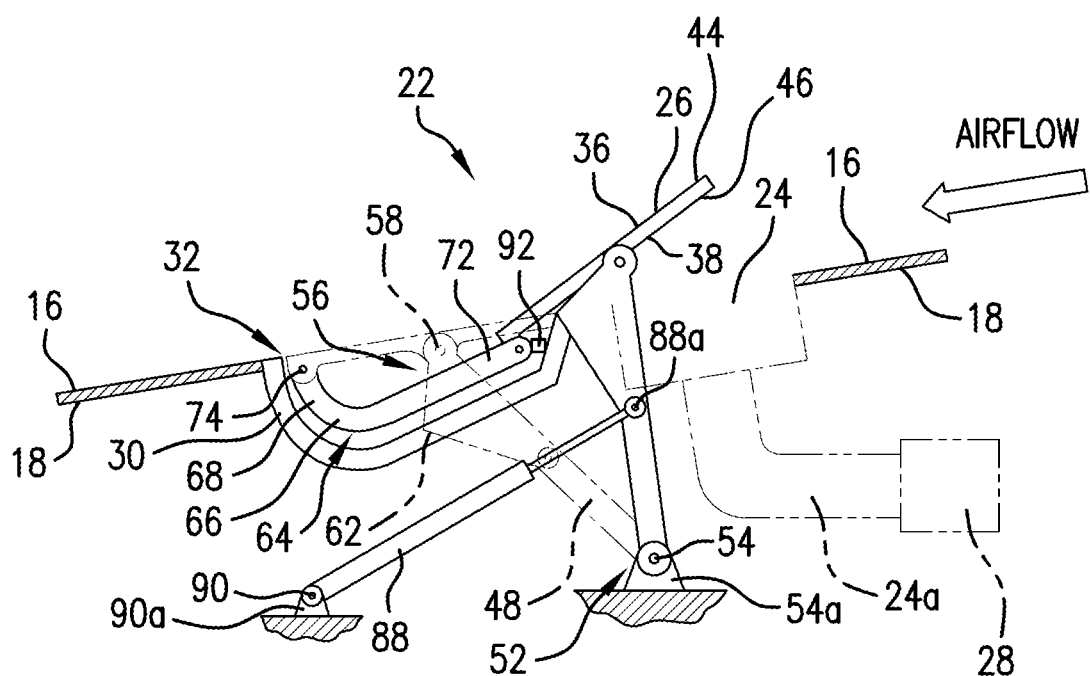
FIG. 3 is a sectional view along sectional line 3-3 of FIG. 2 of an air intake assembly.
Figure 4:
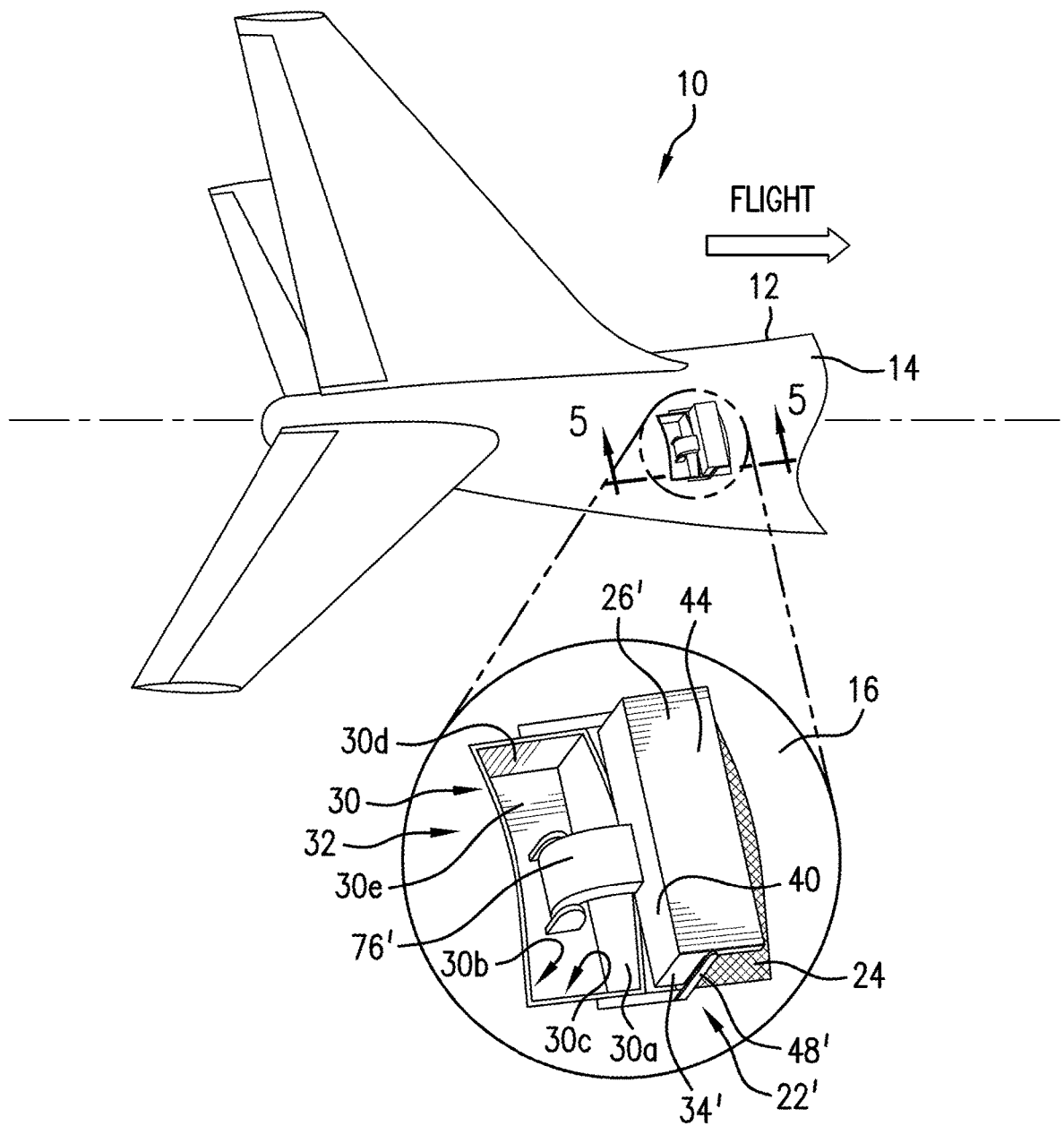
FIG. 4 is a perspective view of an air intake assembly for an aircraft with a translatable scoop in a fully deployed condition.
Figure 5:
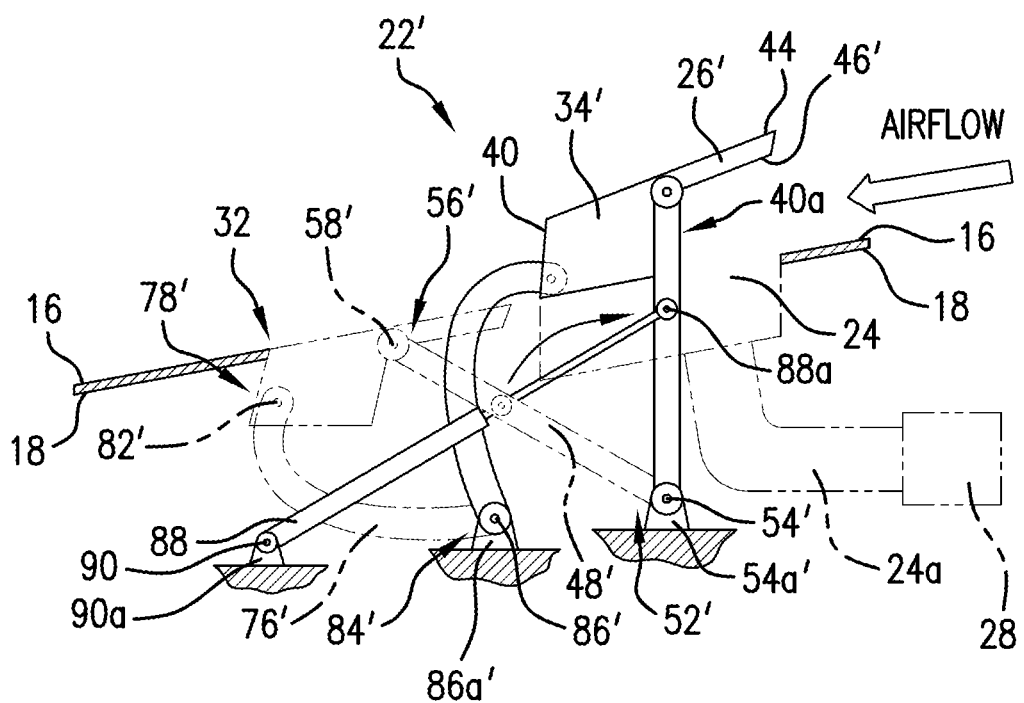
FIG. 5 is a sectional view along sectional line 5-5 of FIG. 4 of an air intake assembly.
Figure 6:
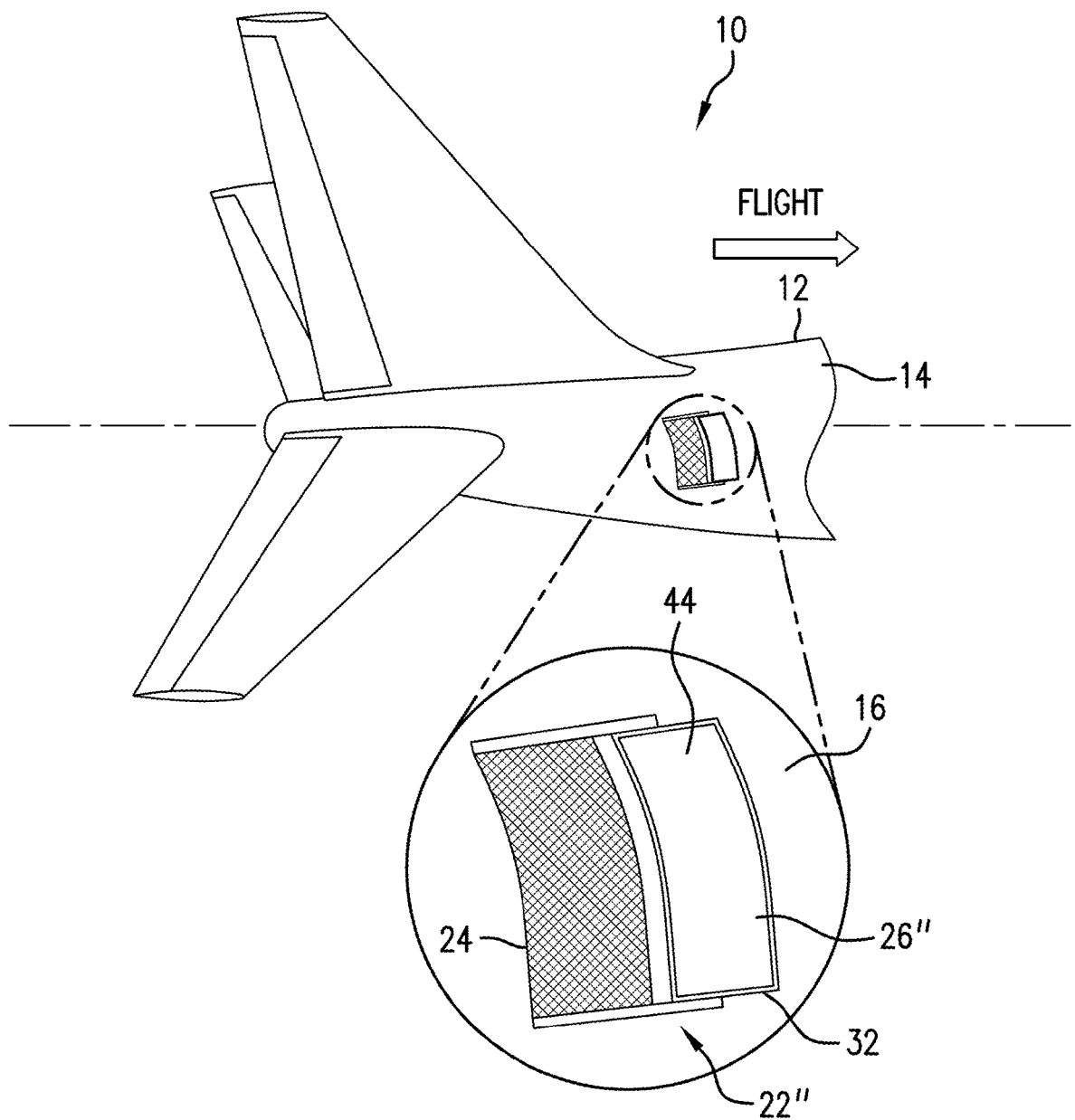
FIG. 6 is a perspective view of an air intake assembly for an aircraft with a translatable scoop in a stowed condition.
Figure 7:
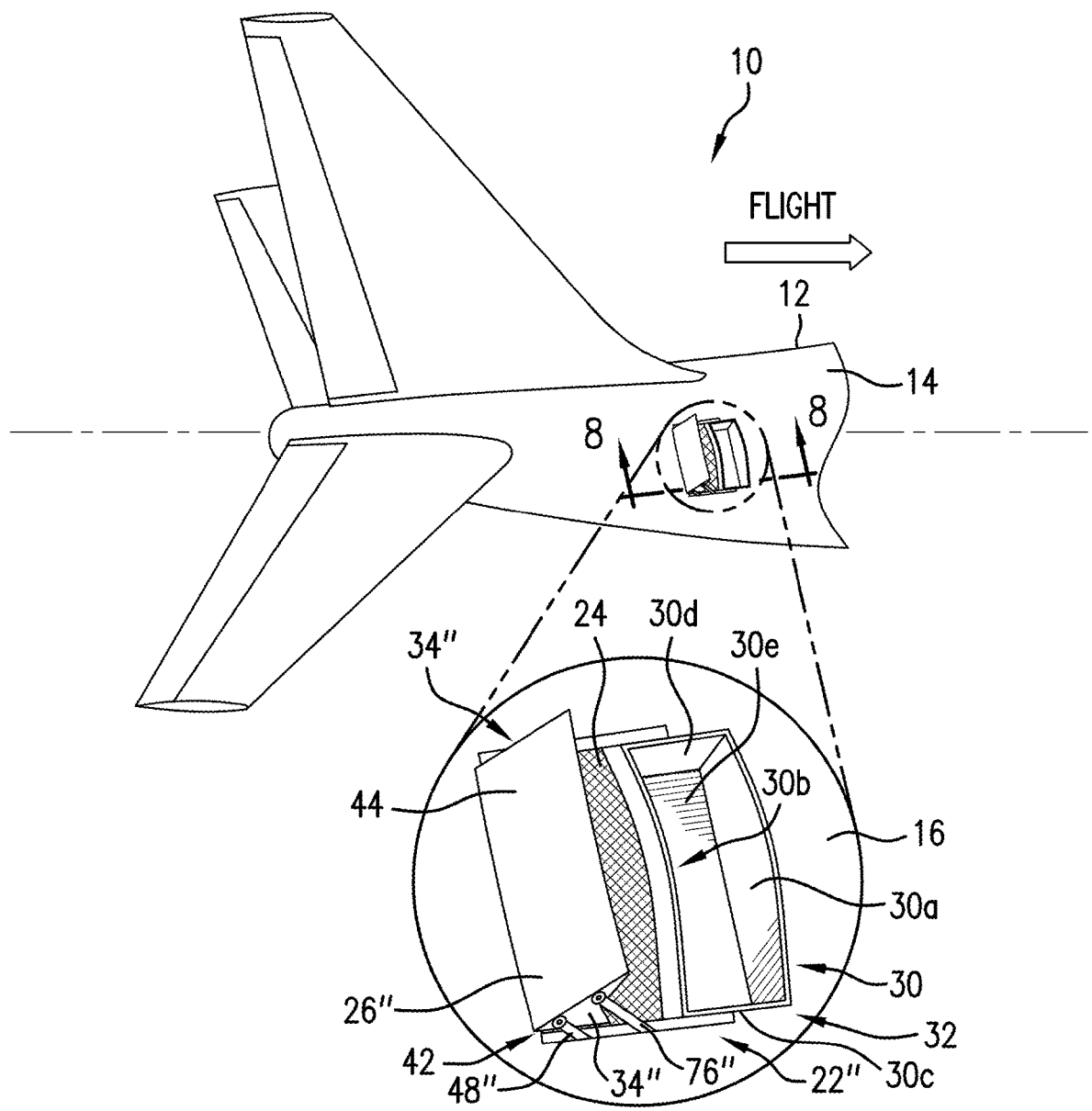
FIG. 7 is a perspective view of an air intake assembly for an aircraft with a translatable scoop in a fully deployed condition.
Figure 8:
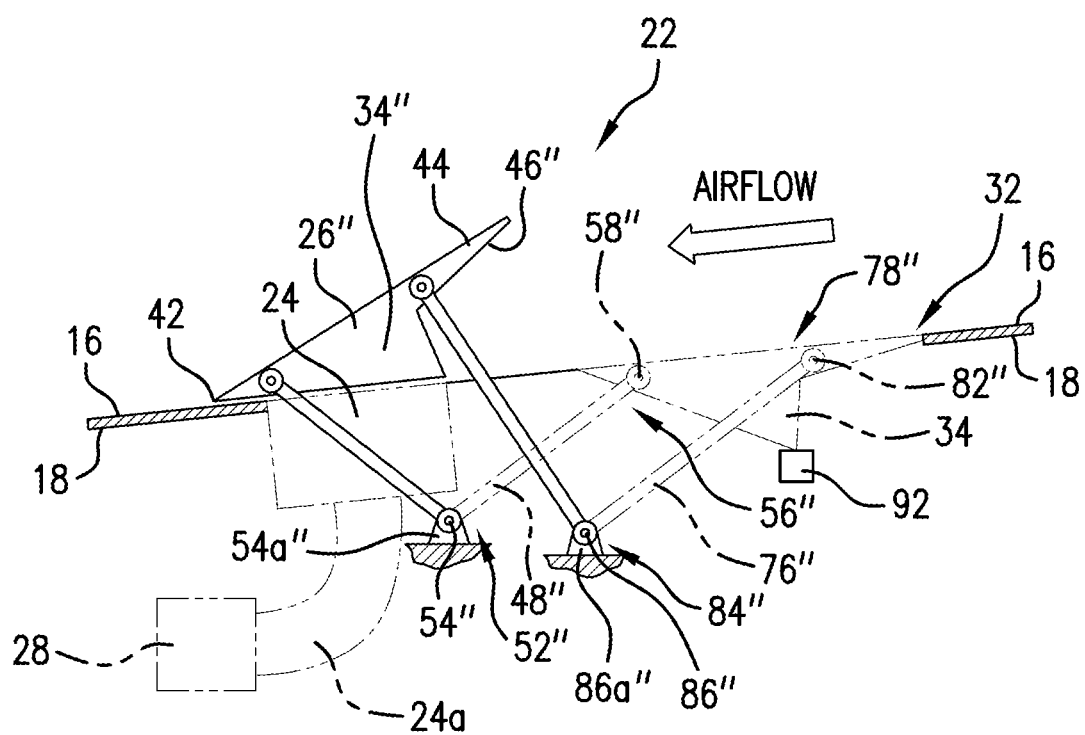
FIG. 8 is a sectional view along sectional line 8-8 of FIG. 7 of an air intake assembly.

FIGS. 1 and 6 show the translatable scoop 26, 26', 26" in a stowed condition and FIGS. 2, 4, and 7 show the translatable scoop 26, 26', 26" in a fully deployed condition. As will be described in more detail hereinafter, the translatable scoop 26, 26', 26" moves from the stowed condition to the fully deployed condition in a linear manner such that the translatable scoop 26, 26', 26" does not rotate about itself. Further, it will be understood that the term "translatable" means the ability to move so that all of its parts (i.e., parts of the scoop 26, 26', 26") travel in the same direction, without rotation or change in shape.

FIGS. 3, 5, and 8 show the translatable scoop 26, 26', 26" in the fully deployed condition in solid lines and in the stowed condition in phantom lines. The translatable scoop 26, 26', 26" directs air exterior to the aircraft 10 (i.e., not within the fuselage 12) into the APU intake 24 when in the fully deployed condition. This exterior air is then supplied to the APU 28. The translatable scoop 26, 26', 26" can be made from any number of materials including, for example, aluminum, titanium, and combinations thereof. As will be appreciated, the translatable scoop 26, 26', 26" is subjected to significant aerodynamic forces when in the deployed condition. As such, the translatable scoop 26, 26', 26" should be made of materials that provide sufficient strength and rigidity so as to not significantly deform when in the deployed condition.

The translatable scoop 26, 26', 26" does not direct the air exterior to the aircraft 10 into the APU intake 24 when the translatable scoop 26, 26', 26" is in the stowed condition. However, even when the translatable scoop 26, 26', 26" is in the stowed condition, the APU 28 can still be operated. However, this operation is in a limited capacity, as exterior air is not being directed into the APU 28 and the APU 28 cannot operate at peak capacity.

As shown in FIGS. 1-5, the translatable scoop 26, 26' is longitudinally rearward from the APU intake 24 when in the stowed condition and in the fully deployed condition. By locating the translatable scoop 26, 26' longitudinally rearward from the APU intake 24 when in the stowed condition, the likelihood of distortion of the air being directed to the APU intake 24 is minimized when the translatable scoop 26, 26' is moved into the fully deployed condition. Because of this, the APU 28 has improved performance.

Alternatively, as shown in FIGS. 6-8, the translatable scoop 26" can be disposed so as to be longitudinally forward from the APU intake 24 when in the stowed condition and longitudinally rearward from the APU intake 24 when in the fully deployed condition. This configuration provides flexibility for the layout of various equipment components when the aircraft 10 is being designed.

The air intake assembly 22, 22', 22" can also include a scoop opening 32. The scoop opening 32 is defined by the aircraft skin 14. Further, when the translatable scoop 26, 26', 26" is in the stowed condition, the scoop opening 32 is sealed by the translatable scoop 26, 26', 26" so as to prevent entrance of the air exterior to the aircraft 10 into the aircraft 10 through the scoop opening 32. Stated plainly, when the translatable scoop 26, 26', 26" is in the stowed condition, fluid communication between an outside of the aircraft 10 and an interior of the aircraft 10, through the scoop opening 32, is prevented.

It will be understood that the element indicated as being the translatable scoop 26, 26', 26" could also include a door member for sealing the scoop opening 32 without departing from the scope of this disclosure. Notably, the translatable scoop 26, 26', 26" of the present disclosure is designed such that it seals the scoop opening 32 when the translatable scoop 26, 26', 26" is in the stowed condition. Optionally, any number of gaskets or other sealing members could be integrated around the scoop opening 32 to further enhance the sealing properties of the assembly. Further, unless otherwise noted, the elements of the air intake assembly 22, 22', 22" can be made of any number of strong and lightweight materials. For example, the elements of the air intake assembly 22, 22', 22" could be made of aluminum, titanium, and combinations thereof.

As shown in FIGS. 2, 4, and 7, the air intake assembly 22, 22', 22" can also include a scoop box 30. The scoop box 30 may include a first wall 30a, a second wall 30b, a third wall 30c, a fourth wall 30d, and a fifth wall 30e. The first wall 30a, the second wall 30b; the third wall 30c, and the fourth wall 30d laterally extend between the scoop opening 32 and the fifth wall 30e.

Further, the walls 30a, 30b, 30c, 30d, 30e cooperate to fluidly isolate the air exterior to the aircraft 10 from the interior of the aircraft 10 when the translatable scoop 26, 26', 26" is in the fully deployed condition. As will be appreciated, this fluidic isolation reduces noise within the aircraft 10 when the translatable scoop 26, 26', 26" is deployed, thereby increasing passenger comfort. For simplicity, the scoop box 30 is only shown in one of the sectional views of the air intake assembly (i.e., FIG. 3). However, it will be understood that the scoop box 30 can be incorporated into the other air intake assemblies shown in the other figures without departing from the scope of the disclosure.

As illustrated in FIGS. 2-3, the translatable scoop 26 can include a deflector wall 36 with an inner surface 38. The inner surface 38 faces the scoop box 30 when the translatable scoop 26 is completely received in the scoop opening 32 and directs the exterior air into the APU intake 24 when the translatable scoop 26 is not completely received in the scoop opening 32. This laterally outward positioning of the translatable scoop allows for a large amount of exterior air to be directed into the APU intake 24.

Alternatively, with reference to FIGS. 4-5 and 7-8, the translatable scoop 26', 26" can include a pair of sidewalls 34', 34" with the deflector wall 36', 36" extending between the sidewalls 34', 34". These sidewalls 34', 34" assist in capturing and directing a maximum amount of exterior air into the APU intake 24.

With reference to FIGS. 2-5 and 7-8, the air intake assembly 22, 22', 22" can also include a drag link 48, 48', 48". The drag link 48, 48', 48" connects the translatable scoop 26, 26', 26" to an interior of the aircraft 10 and limits movement of the translatable scoop 26, 26', 26". The drag link 48, 48', 48" includes a first pinned end 52, 52', 52" that is rotatably attached to the aircraft 10 via a first pin 54, 54', 54" to a first pin mount 54a, 54a', 54a". As will be appreciated, the first pin 54, 54', 54" cooperates with the first pin mount 54a, 54a', 54a' to limit the drag link 48, 48', 48" to rotary movement and the first pin mount 54a, 54a', 54a" is securably attached to an interior of the aircraft 10.

The drag link 48, 48', 48" also includes a second pinned end 56, 56', 56" that is rotatably attached to the translatable scoop 26, 26', 26" via a second pin 58, 58', 58". As such, the drag link 48, 48', 48" rotates about the first pin 54, 54', 54" so as to linearly translate the translatable scoop 26, 26', 26" from the stowed condition to the fully deployed condition. The drag link 48, 48', 48" allows for the air intake assembly 22 to be especially compact. As will be appreciated, a compact design is particularly desirable with aircraft of limited space.

As shown in FIGS. 7-8, the sidewalls 34" of the translatable scoop 26" may include a contact portion 42 that contacts the outer surface 16 of the skin 14 of the aircraft 10 when the translatable scoop 26" is in the fully deployed condition. The contact portion 42 prevents the drag link 48" from over-rotation, and hence, improper orientation of the translatable scoop 26", thereby ensuring that the translatable scoop 26" is positioned so as to maximize the exterior air that is directed to the APU intake 24.

Further, the contact portion 42 prevents over-rotation of the drag link 48", when the translatable scoop 26" is traveling between the stowed and completely deployed condition, to an amount less than 105 degrees. The contact portion 42 also prevents rotation of an actuation link 76", when the translatable scoop 26" is traveling between the stowed and completely deployed condition, to an amount less than 90 degrees. Thus, the contact portion 42 also helps to minimize the overall size of the air intake assembly 22". For reference, the actuation link 76" will be discussed in more detail hereinafter.

With reference to FIGS. 1-8, the translatable scoop 26, 26', 26" also includes an outer face 44 that is coplanar with the outer surface 16 of the aircraft skin 14 when the translatable scoop 26, 26', 26" is in the stowed condition so as to be continuous with the outer surface 16 of the aircraft skin 14. This positioning of the translatable scoop 26, 26', 26" ensures improved aerodynamic performance for the aircraft 10.

The translatable scoop 26, 26', 26" also includes an inner face 46, 46', 46". The inner face 46, 46', 46" faces an interior of the aircraft 10 when the translatable scoop 26, 26', 26" is in the stowed condition. Additionally, as shown in FIGS. 4-5, the inner face 46' is generally parallel to the aircraft skin 14 when the translatable scoop 26' is in the fully deployed condition. Thus, even in the fully deployed condition, improved aerodynamic performance for the aircraft 10 is realized.

As illustrated in FIGS. 2-3, the drag link 48 can include an end wall portion 62 that cooperates with the deflector wall 36 of the translatable scoop 26 to direct exterior air into the APU intake 24 when the translatable scoop 26 is in the fully deployed condition. The end wall portion 62 of the drag link 48 is disposed near the second pinned end 56 and defines a width that is greater than a width of the drag link 48 at the first pinned end 52. Thus, the end wall portion 62 can take the place of a sidewall, thereby reducing the cost to manufacture the component and simplifying assembly of the aircraft 10.

With continued attention to FIGS. 2-3, the air intake assembly 22 may include a guide member 64 that defines a slide channel 66. The guide member 64, and hence the slide channel 66, are fixed with respect to the APU intake 24. As illustrated, the guide member 64 can be generally parallel to the scoop box 30.

Further, the guide member 64 can be disposed laterally outward from the scoop box 30. In particular, the guide member 64 is spaced a distance from the centerline of the aircraft 10 a distance that is greater than the scoop box 30 is spaced from the centerline. Additionally, the slide channel 66 includes a first portion 68 that is curved and a second portion 72 that is straight. The first portion 68 and the second portion 72 will be discussed in more detail hereinafter.

With continued attention to FIGS. 2-3, and specifically FIG. 3, a guide pin 74 is rigidly connected to the translatable scoop 26. The guide pin 74 is slidingly received in the slide channel 66 of the guide member 64 so as to limit movement of the translatable scoop 26. Further, the first portion 68 and the second portion 72 are continuous with one another so as to provide a seamless surface for sliding receipt of the guide pin 74.

The cooperation of the first portion 68 and the second portion 72 allows for the translatable scoop 26 to move into the fully deployed condition and effectively direct air exterior to the aircraft 10 into the APU intake 24 without the need for expensive or heavy powered actuators. Rather, the translatable scoop 26 may merely be unlatched and the translatable scoop 26 manually advanced slightly in a laterally outward direction such that a leading edge of the translatable scoop 26 catches the airflow generated during flight of the aircraft 10.

As such, the kinematics of the air intake assembly 22 is such that the translatable scoop 26 is self-energizing. That is, in-flight Mach pressure can be used to fully open the translatable scoop 26. Upon returning to the ground where the Mach pressure no longer exists, a damper 88 could be used to return the translatable scoop 26 to the stowed condition, as will be described in more detail hereinafter. Thus, no electrically or pneumatically powered actuator is needed to open or close the translatable scoop 26. Instead, mere advancement of the leading edge of the translatable scoop 26 from the stowed condition into the airstream is sufficient for the translatable scoop 26 to fully deploy.

As shown in FIGS. 4-5 and 7-8, the air intake assembly 22', 22" can also include an actuation link 76', 76". The actuation link 76', 76" includes a translatable scoop end 78', 78" that is rotatably attached to the translatable scoop 26', 26" via a third pin 82', 82" and an aircraft end 84', 84" that is rotatably attached to an interior of the aircraft 10 via a fourth pin 86', 86" that is received in an actuation mount 86a', 86a". The actuation mount 86a', 86a" may be integral with the fifth wall 30e or a separate component.

The actuation link 76', 76" rotates about the fourth pin 86', 86" and cooperates with the drag link 48', 48" so as to linearly translate the translatable scoop 26', 26" between the stowed condition and the fully deployed condition. As illustrated in FIGS. 4-5, the actuation link 76' can have a curved shape. This also allows for linearly translation of the translatable scoop 26' from the stowed condition to the fully deployed condition.

As illustrated in FIGS. 3 and 5, the air intake assembly 22, 22' may also include a damper 88. As shown, the damper 88 is mounted to an interior of the aircraft 10 with a first damper pin 90 to a damper mount 90a. The first damper pin 90 and the damper mount 90a allow rotation of the damper 88. As will be appreciated, the damper 88 extends/retracts along its length and is of traditional construction as is known in the art. As will also be appreciated, the damper 88 could be of a shock-absorber type construction or, for example, a spring assembly, without departing from the scope of this disclosure. At an opposite end of the damper 88, the damper 88 is attached to the drag link 48, 48' with a second damper pin 88a. The second damper pin 88a, like the first damper pin 90, allows for rotation.

The damper 88 retards movement of the translatable scoop 26, 26' from the stowed condition to the fully deployed condition. Notably, the translatable scoop 26, 26' may be moved into the fully deployed condition by unlatching a latch that locks the translatable scoop 26, 26' in the stowed condition and advancing the translatable scoop 26, 26' in the laterally outward direction. Once the translatable scoop 26, 26" slightly extends from the scoop opening 32 in the laterally outward direction, the exterior airflow from the aircraft 10 being inflight will cause the translatable scoop 26, 26" to move into the fully deployed condition.

The damper 88 extends between the damper mount 90a, which is fixed to an interior of the aircraft 10, and the drag link 48, 48' to bias the translatable scoop 26 into the stowed condition. Further, the damper 88 exerts a retractive force on the translatable scoop 26, 26' that is less than a force which would be applied by a user to open the translatable scoop 26, 26'.

Figure 9A:
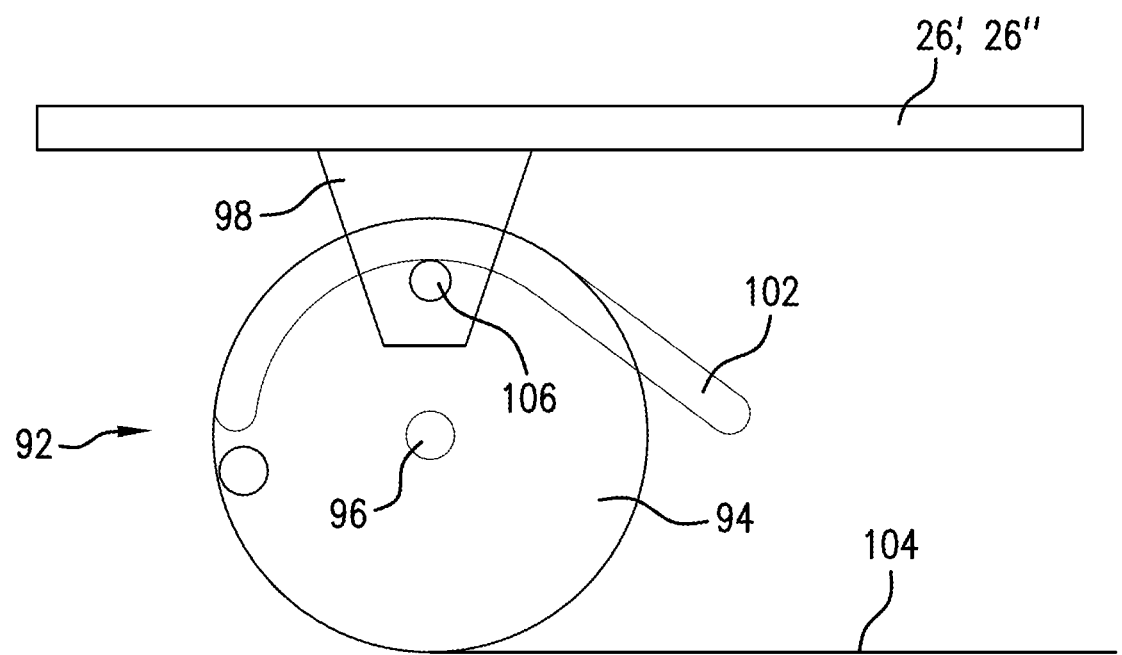
FIG. 9A is a schematic view of a manual actuator with a translatable scoop in a stowed condition.

A manually activated actuator 92 is schematically shown in FIGS. 3 and 8. Further, the manually activated actuator 92 also shown in FIGS. 9A-9B. The manually activated actuator 92 is used to manually move the translatable scoop 26, 26" from the stowed condition. The manually activated actuator 92 includes a pulley 94 that rotates about a pulley pin 96. The pulley pin 96 is fixed with respect to an interior of the aircraft 10. The pulley 94 can be rotated by pulling the cable 104. This rotation of the pulley 94 causes a rigid arm 102 that is attached to the pulley 94 to contact the translatable scoop 26, 26". A bracket 98 is fixed to the translatable scoop 26, 26" and is used to mount a latch pin 106. In the closed position (i.e., stowed condition), the rigid arm 102 secures the translatable scoop 26, 26" by pulling down on the latch pin 106.

Figure 9B:
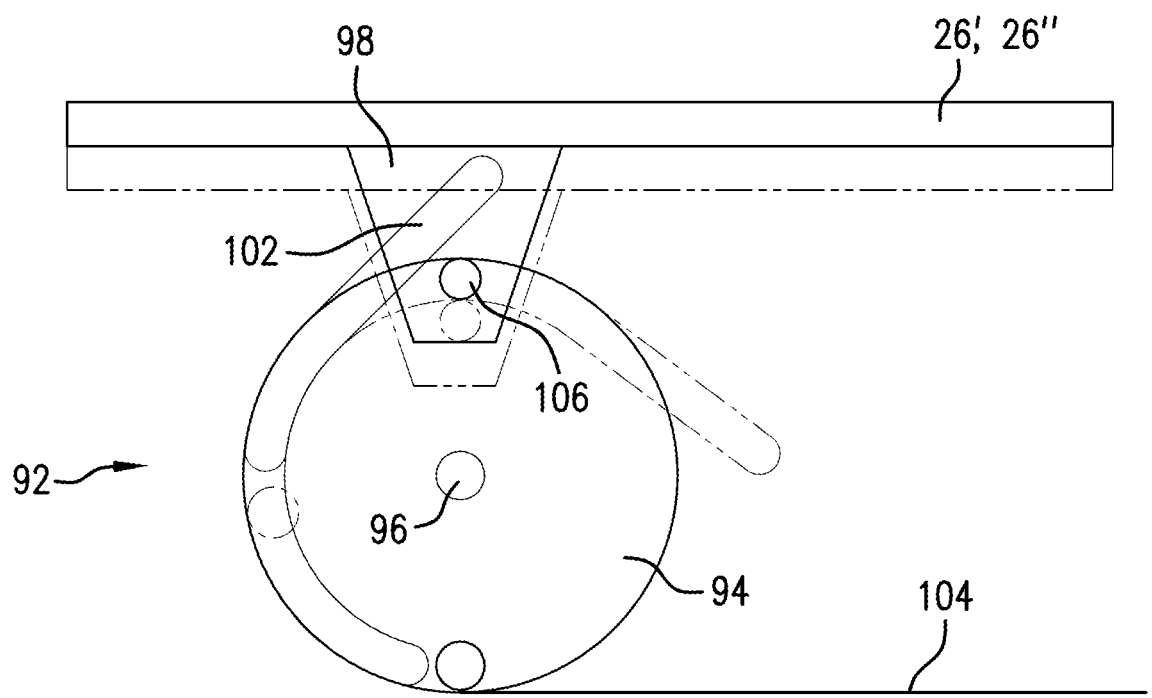
FIG. 9B is a schematic view of a manual actuator with a translatable scoop in a non-stowed condition.

As shown by the phantom lines in FIG. 9B, the manually activated actuator 92 rotates the pulley 94 and hence the rigid arm 102 counter clockwise and releases the latch pin 106 which allows the translatable scoop 26, 26" to open. The rigid arm 102 also displaces the translatable scoop 26, 26" a minimal amount in the laterally outward direction. Upon such displacement, the exterior airflow will then cause the translatable scoop 26, 26" to fully deploy. Thus, the air intake assemblies 22 and 22" do not require a powered actuator (e.g., electrically or pneumatically). As such, as compared to an aircraft using a powered actuator, the overall weight of the aircraft 10 without the powered actuator is reduced. Further, the material cost for building an aircraft without a powered actuator is reduced. Further still, there are less powered objects on the aircraft 10 that could fail, thereby improving the overall reliability of the aircraft 10.

A translatable scoop has been described above with particularity. Modifications and alterations will occur to those upon reading and understanding the preceding detailed description. The invention, however, is not limited to only the embodiments described above. Instead, the invention is broadly defined by the appended claims and the equivalents thereof. Moreover, it will be appreciated that variations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air intake assembly for supplying air to an auxiliary power unit of an aircraft, the air intake assembly comprising:
an auxiliary power unit intake defined by a skin of the aircraft; and
a translatable scoop that defines a stowed condition and a fully deployed condition, wherein the translatable scoop directs air exterior to the aircraft into the auxiliary power unit intake when in the fully deployed condition and does not direct the air exterior to the aircraft into the auxiliary power unit intake when in the stowed condition, wherein the translatable scoop is longitudinally rearward from the auxiliary power unit intake when in the stowed condition and in the fully deployed condition.

2. The air intake assembly of claim 1, wherein the translatable scoop moves from the stowed condition to the fully deployed condition in a linear manner such that the translatable scoop does not rotate about itself.

3. The air intake assembly of claim 1, further comprising:
a scoop opening defined by the aircraft skin, the scoop opening being sealed by the translatable scoop so as to prevent entrance of the air exterior to the aircraft into the aircraft through the scoop opening when the translatable scoop is in the stowed condition; and
a scoop box that is fixed with respect to the scoop opening and surrounds the scoop opening so as to fluidly isolate the air exterior to the aircraft from an interior of the aircraft when the translatable scoop is in the fully deployed condition.

4. The air intake assembly of claim 3, wherein the translatable scoop includes a deflector wall with an inner surface that faces the scoop box when the translatable scoop is completely received in the scoop opening and directs the exterior air into the auxiliary power unit intake when the translatable scoop is not completely received in the scoop opening.

5. The air intake assembly of claim 1, further comprising a drag link including a first pinned end that is rotatably attached to the aircraft via a first pin that is received by a first pin mount and a second pinned end that is rotatably attached to the translatable scoop via a second pin, wherein the drag link rotates about the first pin so as to linearly translate the translatable scoop from the stowed condition to the fully deployed condition.

6. The air intake assembly of claim 5, further comprising a damper that extends between a damper mount of the aircraft and the drag link to bias the translatable scoop into the stowed condition, wherein the damper exerts a retractive force on the translatable scoop that is less than a force which would be applied by a user to move the translatable scoop from the stowed condition.

7. The air intake assembly of claim 5, wherein the drag link includes an end wall portion that cooperates with a deflector wall of the translatable scoop to direct exterior air into the auxiliary power unit intake when the translatable scoop is in the fully deployed condition, wherein the end wall portion is disposed near the second pinned end and defines a width that is greater than a width of the drag link at the first pinned end.

8. The air intake assembly of claim 1, further comprising:
a guide member that defines a slide channel, wherein the slide channel is fixed with respect to the auxiliary power unit intake; and
a guide pin rigidly connected to the translatable scoop and slidingly received in the slide channel of the guide member so as to limit movement of the translatable scoop.

9. The air intake assembly of claim 8, wherein the slide channel includes a first portion that is curved and a second portion that is straight, and wherein the first portion and the second portion are continuous with one another so as to provide a seamless surface for sliding receipt of the guide pin.

10. An air intake assembly for supplying air to an auxiliary power unit of an aircraft, the air intake assembly comprising:
an auxiliary power unit intake defined by a skin of the aircraft;
a translatable scoop that defines a stowed condition and a fully deployed condition, wherein the translatable scoop directs air exterior to the aircraft into the auxiliary power unit intake when in the fully deployed condition and does not direct the air exterior to the aircraft into the auxiliary power unit intake when in the stowed condition;
a guide member that defines a slide channel, wherein the slide channel is fixed with respect to the auxiliary power unit intake; and
a guide pin rigidly connected to the translatable scoop and slidingly received in the slide channel of the guide member so as to limit movement of the translatable scoop.

11. The air intake assembly of claim 10, wherein the translatable scoop moves from the stowed condition to the fully deployed condition in a linear manner such that the translatable scoop does not rotate about itself.

12. The air intake assembly of claim 10, further comprising a drag link including a first pinned end that is rotatably attached to the aircraft via a first pin that is received by a first pin mount and a second pinned end that is rotatably attached to the translatable scoop via a second pin, wherein the drag link rotates about the first pin so as to linearly translate the translatable scoop from the stowed condition to the fully deployed, condition.

13. The air intake assembly of claim 10, wherein the slide channel includes a first portion that is curved and a second portion that is straight, and wherein the first portion and the second portion are continuous with one another so as to provide a seamless surface for sliding receipt of the guide pin.

14. The air intake assembly of claim 10, further comprising:
- a scoop opening defined by the aircraft skin, the scoop opening being sealed by the translatable scoop so as to prevent entrance of the air exterior to the aircraft into the aircraft through the scoop opening when the translatable scoop is in the stowed condition; and
- a scoop box that is fixed with respect to the scoop opening and surrounds the scoop opening so as to fluidly isolate the air exterior to the aircraft from an interior of the aircraft when the translatable scoop is in the fully deployed condition.

15. The air intake assembly of claim 14, wherein the translatable scoop includes a deflector wall with an inner surface that faces the scoop box when the translatable scoop is completely received in the scoop opening and directs the exterior air into the auxiliary power unit intake when the translatable scoop is not completely received in the scoop opening.

* * * * *